US010805335B2

(12) United States Patent
Nishi (10) Patent No.: US 10,805,335 B2
(45) Date of Patent: Oct. 13, 2020

(54) APPLICATION SECURITY MANAGEMENT SYSTEM AND EDGE SERVER

(71) Applicant: FANUC CORPORATION, Minamitsuru-gun, Yamanashi (JP)

(72) Inventor: Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 249 days.

(21) Appl. No.: 16/120,950

(22) Filed: Sep. 4, 2018

(65) Prior Publication Data

US 2019/0089729 A1 Mar. 21, 2019

(30) Foreign Application Priority Data

Sep. 20, 2017 (JP) ................. 2017-179815

(51) Int. Cl.
*H04L 29/06* (2006.01)
*G06Q 30/06* (2012.01)

(52) U.S. Cl.
CPC ..... *H04L 63/1433* (2013.01); *G06Q 30/0635* (2013.01); *H04L 63/10* (2013.01); *H04L 63/1416* (2013.01)

(58) Field of Classification Search
CPC .......... G06F 9/00; G06F 21/121; G06F 11/00; G06F 11/3003; G06F 11/3048; G06F 11/30; G06Q 30/0635; G06Q 30/0637
See application file for complete search history.

(56) References Cited

U.S. PATENT DOCUMENTS

| 9,665,465 | B1 | 5/2017 | Jain et al. | |
| 2002/0183056 | A1* | 12/2002 | Lundblade | G06F 21/51 455/425 |
| 2009/0178044 | A1* | 7/2009 | Musuvathi | G06F 9/4881 718/102 |

(Continued)

FOREIGN PATENT DOCUMENTS

| JP | 10-111833 | 4/1998 |
| JP | 2000-112891 | 4/2000 |
| JP | 2011-233081 | 11/2011 |

(Continued)

*Primary Examiner* — Lynn D Feild
*Assistant Examiner* — Richard A McCoy
(74) *Attorney, Agent, or Firm* — Wenderoth, Lind & Ponack, L.L.P.

(57) ABSTRACT

An application security management system and an edge server which enable an application developed by an application developer to be executed only in a state that matches a security risk reported by the developer are provided. In an application security management system, an evaluation management server that manages evaluation of an application developed by an application developer and executed by an edge server registers the application and an access report list related to the usability of a function of the edge device and/or the accessibility of processing data of the edge device after evaluation in an application DB. A distribution management server system that manages distribution of the evaluated application notifies a user who issued a purchase request of the access report list upon receiving the purchase request for the application and distributes the application and the access report list to the edge server when authorization data is received only.

5 Claims, 7 Drawing Sheets

(56) References Cited

U.S. PATENT DOCUMENTS

2011/0276951 A1* 11/2011 Jain .................... G06F 11/3006
717/140

FOREIGN PATENT DOCUMENTS

| JP | 2012-043228 | 3/2012 |
| JP | 2014-102673 | 6/2014 |
| JP | 2014-526734 | 10/2014 |
| JP | 2015-121906 | 7/2015 |
| JP | 2014-174778 | 9/2017 |
| WO | 2017/035536 | 3/2017 |

* cited by examiner

ACCESS REPORT LIST 620

| | |
|---|---|
| ☐ CAN DISPLAY PRESENT STATE OF MANUFACTURING APPARATUS | PROCESSING DATA |
| ☐ CAN STORE PRESENT STATE OF MANUFACTURING APPARATUS | |
| ☐ CAN DISPLAY MANUFACTURING HISTORY | |
| ☐ CAN STORE MANUFACTURING HISTORY | |
| ☐ CAN DISPLAY PRODUCT QUALITY INFORMATION | |
| ☐ CAN STORE PRODUCT QUALITY INFORMATION | |
| ... | |
| ☐ CAN ISSUE INSTRUCTION ON STARTING AND STOPPING MANUFACTURING | FUNCTION |
| ☐ CAN DISPLAY MANUFACTURING PROGRAM | |
| ☐ CAN CHANGE MANUFACTURING PROGRAM | |
| ☐ CAN STORE MANUFACTURING PROGRAM | |
| ☐ CAN DISPLAY SETTING OF MANUFACTURING APPARATUS | |
| ☐ CAN CHANGE SETTING OF MANUFACTURING APPARATUS | |
| ☐ CAN STORE SETTING OF MANUFACTURING APPARATUS | |
| ☐ CAN CONTROL MANUFACTURING APPARATUS AT REMOTE SITE | |
| ☐ CAN MAINTAIN MANUFACTURING APPARATUS AT REMOTE SITE | |
| ☐ CAN UPLOAD DATA TO INTERNET | |
| ☐ CAN DOWNLOAD DATA FROM INTERNET | |
| ☐ CAN RECORD COMMUNICATION DATA | |
| ☐ CAN RELAY COMMUNICATION DATA | |
| ... | |

FIG. 4

CNC DATA MODEL 630

| CATEGORY | COMMON DATA | PART DATA |
|---|---|---|
| OPERATING STATE INFORMATION | OPERATING STATE<br>OPERATING STATE CNC | OPERATING STATE OF CNC SYSTEM<br>OPERATING STATE OF CNC SHAFT<br>OPERATING STATE OF CNC MOTOR<br>OPERATING STATE OF SENSORS<br>... |
| PRODUCTION STATE INFORMATION | PRODUCTION STATE | — |
| QUALITY MAINTENANCE INFORMATION | QUALITY MAINTENANCE INFORMATION<br>QUALITY MAINTENANCE INFORMATION CNC | QUALITY MAINTENANCE INFORMATION OF CNC SYSTEM<br>QUALITY MAINTENANCE INFORMATION OF CNC SHAFT<br>QUALITY MAINTENANCE INFORMATION OF CNC MOTOR<br>QUALITY MAINTENANCE INSPECTION RESULT<br>... |
| INFORMATION ON VARIOUS EVENTS | OPERATION HISTORY<br>PROGRAM CHANGE HISTORY<br>ALARM HISTORY<br>MAINTENANCE NOTIFICATION EVENT<br>FAILURE FORECAST EVENT<br>... | — |
| ARCHIVE | MAINTENANCE SPECIFICATION ARCHIVE<br>... | INDIVIDUAL ARCHIVES<br>... |

FIG. 5

FROM RECEPTION TO DISTRIBUTION OF APPLICATION ial apparatus, or an industrial robot) of a
APPLICATION SECURITY MANAGEMENT SYSTEM AND EDGE SERVER This application is based on and claims the benefit of priority from Japanese Patent Application No. 2017-179815, filed on 20 Sep. 2017, the content of which is incorporated herein by reference.

BACKGROUND OF THE INVENTION

Field of the Invention

The present invention relates to an application security management system and an edge server.

Related Art

Recently, in a field of a manufacturing apparatus, server application software products (hereinafter simply referred to as "applications" or "apps") having various functions and purposes to be used in manufacturing sites have been developed by various companies. In a manufacturing site, a developed application may be downloaded from a download site to a controller of an application user via the Internet, for example, and may be used by the user. However, applications have various security risks. For example, an application having a function of collecting communication data of a manufacturing site may include a risk that the communication data is misused. Moreover, an application that collects manufacturing quality data of a manufacturing site may include a risk that the quality of a manufactured product is revealed by analyzing the collected manufacturing quality data. Furthermore, an application having a function of remotely operating and maintaining a manufacturing apparatus (for example, a machine tool such as a CNC machine tool, an industrial apparatus, or an industrial robot) of a manufacturing site may include a risk that the manufacturing apparatus of the manufacturing site is stopped from an external device or an operation thereof is interrupted from an external device.

In this way, a manufacturing apparatus of a manufacturing site, which uses an application, may potentially involve a security risk of the application. Therefore, the security risk may be avoided by another method or an operation method. For example, a system disclosed in Patent Document 1 determines abnormality of an application. Specifically, a permission comparing unit 13 reads a permission list correlated with type information matching the type information input from a permission extraction unit 12 from a permission list storage unit 11 and compares the read permission list with a permission list output from the permission extraction unit 12 to determine abnormality of an application.

Patent Document 1: Japanese Unexamined Patent Application, Publication No. 2011-233081

SUMMARY OF THE INVENTION

However, an application user needs to understand a security risk of the application before using the application. That is, an application user needs to identify a security risk of the application, correctly understand that the application has a security risk, and use the application. Moreover, it is necessary to prevent a malicious application developer from concealing the security risk from users and misusing the application. An object of the present invention is to provide an application security management system and an edge server which enable an application developed by an application developer to be executed only in a state that matches a security risk reported by the developer.

(1) An application security management system (for example, an "application security management system 1000" to be described later) of the present invention includes: an application distribution management server system (for example, a "distribution management server system 300" to be described later) that manages distribution of an application executed by an edge server (for example, an "edge server 400" to be described later) communicably connected to one or more edge devices (for example, an "edge device 500" to be described later); an application evaluation management server (for example, an "evaluation management server 100" to be described later) that manages evaluation of the application developed by an application developer and distributed by the application distribution management server system; an application storage unit (for example, an "application DB 305" to be described later) that stores the application of which the distribution is managed by the application distribution management server system; and the edge server that manages execution of the application, wherein the application evaluation management server includes: an application receiving unit (for example, an "application receiving unit 111" to be described later) that receives the application and a security risk list (for example, an "access report list" to be described later) related to usability of a function of the edge device and accessibility to processing data of the edge device used when the application is executed by the edge server; an application evaluation unit (for example, an "application evaluation unit 112" to be described later) that evaluates whether a content of the use of the function of the edge device and/or the access to the processing data of the edge device by the application received by the application receiving unit matches the accessibility illustrated in the security risk list on the basis of analysis of a source code of the application and/or operation analysis obtained by the edge server executing the application; and an application registration unit (for example, an "application registration unit 113" to be described later) that authorizes that the application is distributed and managed by the application distribution management server system when the result of evaluation of the application evaluation unit indicates that the content of the use of the function of the edge device and/or the access to the processing data of the edge device by the application matches the accessibility illustrated in the security risk list and registers the application and the security risk list in the application storage unit in correlation, the application distribution management server system includes: a risk list notification unit (for example, a "risk list notification unit 311" to be described later) that notifies a user who issued a purchase request or a distribution request of the security risk list corresponding to the application upon receiving a purchase request or a distribution request for the application stored in the application storage unit is received; and an application distribution unit (for example, an "application distribution unit 312" to be described later) that receives authorization data from the user with respect to the security risk list notified of by the risk list notification unit and distributes the application to the edge server in correlation with the security risk list only when distribution authorization information is presented, and the edge server includes: a storage unit (for example, a "storage unit 420" to be described later) that stores the distributed application and the distributed security risk list; an application execution unit (for example, an "application execution unit 411" to be described later) that executes the application on the basis of an activation request for the application; and an access control unit (for example, an "access control unit 412" to be described later) that monitors an access state of the use of the function of the edge device and/or the processing data of the edge device on the basis of the content of the security risk list and allows the use of the function of the edge device and/or the access to the processing data of the edge device reported as accessible in the security risk list.

(2) In the application security management system (for example, an "application security management system 1000" to be described later) according to (1), the security risk list (for example, an "access report list" to be described later) may indicate the right to use the function of the edge device (for example, an "edge device 500" to be described later) and/or access the processing data of the edge device, and the risk list notification unit (for example, a "risk list notification unit 311" to be described later) of the application distribution management server system (for example, a "distribution management server system 300" to be described later) may notify of at least a security risk list related to the right to use the function of the edge device and/or access the processing data of the edge device allowed for the application.

(3) In the application security management system (for example, an "application security management system 1000" to be described later) according to (1) or (2), the security risk list (for example, an "access report list" to be described later) may include: usability of each function related to an operating state of the edge device (for example, an "edge device 500" to be described later) and/or accessibility of each piece of processing data; usability of each function related to a production state of the edge device and/or accessibility of each piece of processing data; usability of each function related to quality maintenance of the edge device and/or accessibility of each piece of processing data; usability of each function related to an event (history) of the edge device and/or accessibility of each piece of processing data; and usability of each function related to an archive of the edge device and/or accessibility of each piece of processing data.

(4) In the application security management system (for example, an "application security management system 1000" to be described later) according to any one of (1) to (3), the edge server (for example, an "edge server 400" to be described later) may include: an illegal application notification unit (for example, an "illegal application notification unit 413" to be described later) that notifies the application distribution management server system (for example, a "distribution management server system 300" to be described later) of illegal information of the application when the access control unit (for example, an "access control unit 412" to be described later) detects an illegal access request which is the request for using the function related to the edge device (for example, an "edge device 500" to be described later) and/or the request for accessing the processing data of the edge device, which is not illustrated in the security risk list (for example, an "access report list" to be described later) correlated with the application, and the access control unit may terminate the application when the illegal access request is detected.

(5) In the application security management system (for example, an "application security management system 1000" to be described later) according to (4), the application distribution management server system (for example, a "distribution management server system 300" to be described later) may further include: an illegal notification unit (for example, an "illegal notification unit 313" to be described later) that notifies an edge server that distributed the application of illegal information of the application upon receiving the illegal information of the application from the illegal application notification unit (for example, an "illegal application notification unit 413" to be described later) of the edge server (for example, an "edge server 400" to be described later), and the access control unit (for example, an "access control unit 412" to be described later) of the edge server may further terminate the application upon receiving illegal information of the application from the application distribution management server system.

(6) An edge server (for example, an "edge server 400" to be described later) of the present invention is communicably connected to an application distribution management server system (for example, a "distribution management server system 300" to be described later) and one or more edge devices (for example, an "edge device 500" to be described later), the edge server includes: a storage unit (for example, a "storage unit 420" to be described later) that stores an application distributed from the application distribution management server system and executed and a security risk list (for example, an "access report list" to be described later) related to usability of the function of the edge device and/or accessibility to processing data of the edge device by the application, distributed together with the application; an application execution unit (for example, an "application execution unit 411" to be described later) that executes the application that uses the function of the edge device and/or accesses the processing data of the edge device on the basis of an activation request for the application; and an access control unit (for example, an "access control unit 412" to be described later) that monitors a request for using the function of the edge device and/or a request for accessing the processing data of the edge device by the application on the basis of a content of the security risk list and allows the request for using the function related to the edge device and/or accessing the processing data of the edge device illustrated in the security risk list, wherein the security risk list may be registered by an application developer together with the application and distribution thereof may be managed by the application distribution management server system.

According to the present invention, it is possible to provide an application security management system and an edge server which enable an application developed by an application developer to be executed only in a state that matches a security risk reported by the developer.

DETAILED DESCRIPTION OF THE INVENTION

Embodiment

Figure 1:
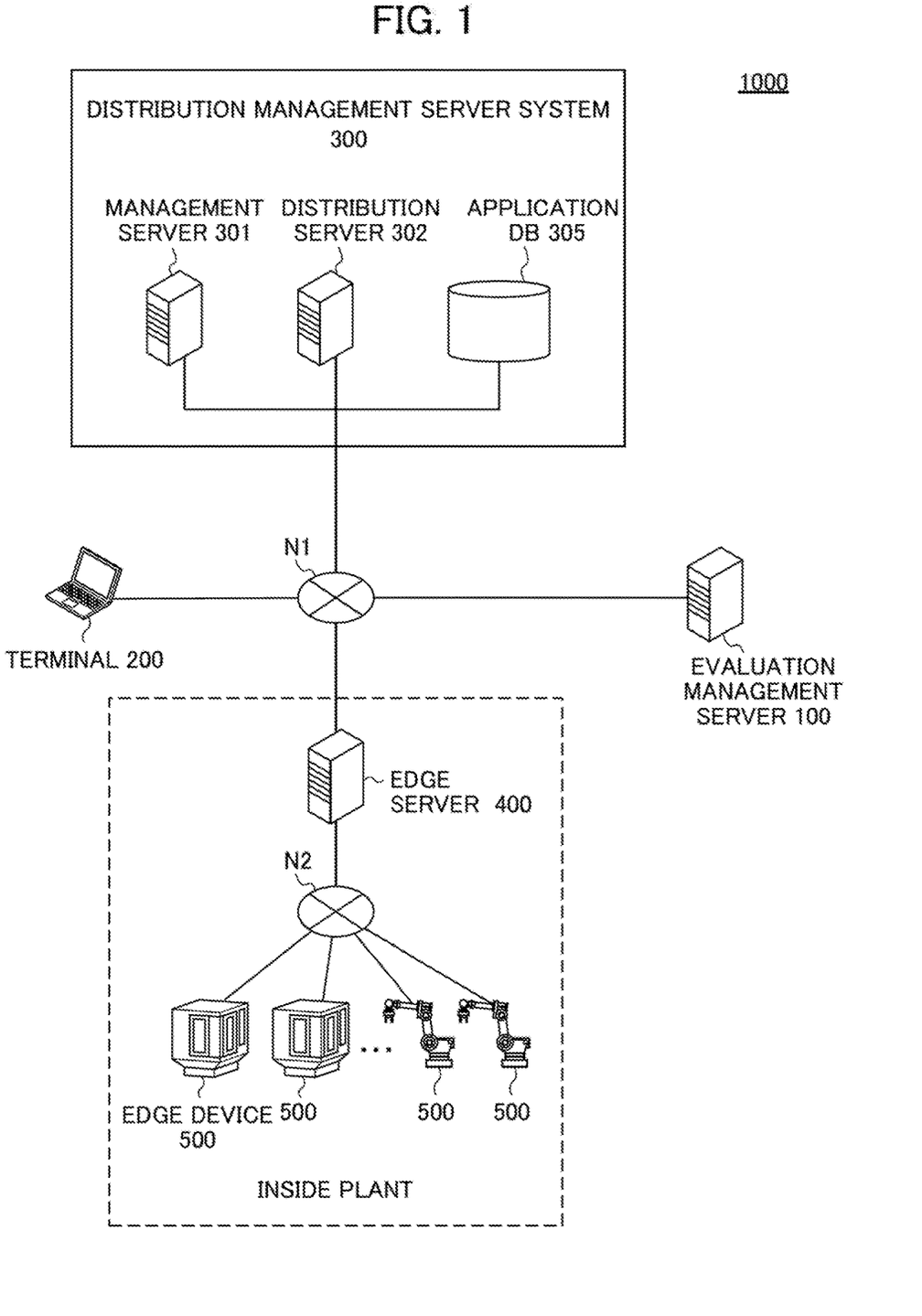
FIG. 1 is a schematic diagram illustrating a basic configuration of an application security management system according to the present embodiment.

An outline of a configuration of an application security management system 1000 (hereinafter simply referred to as an "application security management system 1000") according to the present embodiment will be described. FIG. 1 is a schematic diagram illustrating a basic configuration of the application security management system 1000 of the present embodiment. The application security management system 1000 includes an application evaluation management server 100 (hereinafter simply referred to as an "evaluation management server 100"), a user terminal 200 (hereinafter simply referred to as a "terminal 200"), an application distribution management server system 300 (hereinafter simply referred to as a "distribution management server system 300"), an edge server 400, and an edge device 500. Here, the edge device 500 indicates a manufacturing apparatus including a CNC machine tool, an industrial apparatus, an industrial robot, and the like, provided in a manufacturing site such as a plant and an apparatus associated with the manufacturing apparatus such as an image sensor or a programmable logic controller (PLC) unless particularly stated otherwise. The edge server 400 is a server that executes an application distributed from the distribution management server system 300 to thereby collect data indicating the operation state related to one or more edge devices 500, data indicating the production state, data indicating the quality state of a product, and data indicating the operating state, for example, from the edge devices 500 to perform predetermined information processing related to the application.

In the application security management system 1000, the evaluation management server 100 registers an application authorized by evaluation among applications developed by an application developer and operated by the edge server 400 in an application storage unit 305 (hereinafter simply referred to as an "application database (DB) 305"). In the application security management system 1000, the distribution management server system 300 notifies an end user of a security risk list (hereinafter also referred to as an "access report list") related to the usability of a function of the edge device 500 and/or the accessibility to the processing data of the edge device 500, used when execution of an application on the basis of an application purchase request or an application distribution request of the end user who uses the edge device 500 and the edge server 400. When the access report list is confirmed by the end user, the application security management system 1000 distributes the application extracted from the application DB 305 and the access report list to the edge server 400. During execution of the application, the edge server 400 controls the use of the function of the edge device 500 and/or the access to the processing data of the edge device 500 on the basis of the access report list.

The evaluation management server 100, the terminal 200, the distribution management server system 300, and the edge server 400 are connected via a network N1. The network N1 is the Internet, a virtual private network (VPN), a public telephone network, or the like, for example. A specific communication method of the network N1 and whether the network is a cable connection or a wireless connection are not particularly limited. The edge server 400 and one or more edge devices 500 are provided in a plant facility or the like of an end user, for example, and are communicably connected via a network N2 such as a local area network (LAN). The network N2 may include a network switch or the like.

The evaluation management server 100 and the distribution management server system 300 are operated and managed by a company (hereinafter also referred to as an operating company) that performs sales and management of applications operating in the edge server 400. The evaluation management server 100 is a server that receives and evaluates the application developed by the application developer and the access report list and registers the authorized application in the application DB 305 in correlation with the access report list.

The terminal 200 is a personal computer (PC), for example. The terminal 200 is a terminal communicably connected to the evaluation management server 100 (for example, a terminal provided to an application developer, a management terminal of the evaluation management server 100, and the like). The terminal 200 is a terminal which is communicably connected to the distribution management server system 300 and is used by an end user having a plant facility including the edge server 400 and the edge device 500 and a specialized dealer such as a system integrator. Hereinafter, an end user and a specialized dealer will be simply referred to as a "user" when they are not distinguished from each other. However, an operation of setting an application for collecting and utilizing various pieces of data obtained from a CNC machine tool, an industrial apparatus, an industrial robot, and the like provided in a plant or the like requires specialized knowledge. Due to this, it is a common practice that a specialized dealer such as a system integrator makes environment settings for hardware and software when utilizing an application in a manufacturing site such as a plant. Here, the terminal 200 used by an end user may be provided inside a plant facility and may be provided outside a plant facility. The end user can access the distribution management server system 300 via the terminal 200 to issue an install request for applications distributable to the edge server 400 by presenting distribution permission information (for example, a serial number showing that the user has purchased the application).

As illustrated in FIG. 1, the distribution management server system 300 is a distributed system including a management server 301, a distribution server 302, and the application DB 305. However, the distribution management server system 300 is not limited to the distributed system. The distribution management server system 300 may be configured as one server having the functions of the management server 301, the distribution server 302, and the application DB 305 and may be configured as a plurality of servers and processes may be distributed to respective servers. In the distribution management server system 300, the management server 301, for example, may be communicably connected to the edge server 400 and the like via the network N1, and the distribution server 302 and the application DB 305 may communicate with the edge server 400 or the like via the management server 301 without being connected to the network N1. The application DB 305 may be provided separately from the distribution management server system 300 and may be connected directly to the network N1.

The edge server 400 is a server that executes an application downloaded from the distribution management server system 300 to thereby execute a function related to one or more edge devices 500 and/or collect processing data of the edge devices 500 from the edge devices 500 and perform predetermined information processing related to the application. The edge server 400 monitors the use of the function related to the edge device 500 and/or the access to the processing data of the edge device 500 during execution of the application. The edge server 400 allows the use of the function related to the edge device 500 and/or the access to the processing data of the edge device 500 illustrated in the access report list only. As described above, the edge device 500 is a manufacturing apparatus such as a CNC machine tool, an industrial apparatus, or an industrial robot provided in a manufacturing site such as a plant. One or more edge devices 500 form a line or a cell of a plant, for example.

The application security management system 1000 can be used only by a user who is evaluated by an operating company in advance to satisfy necessary requirements (qualifications or the like) and is assigned with a user identification (ID) for accessing the application security management system 1000.

Figure 2:
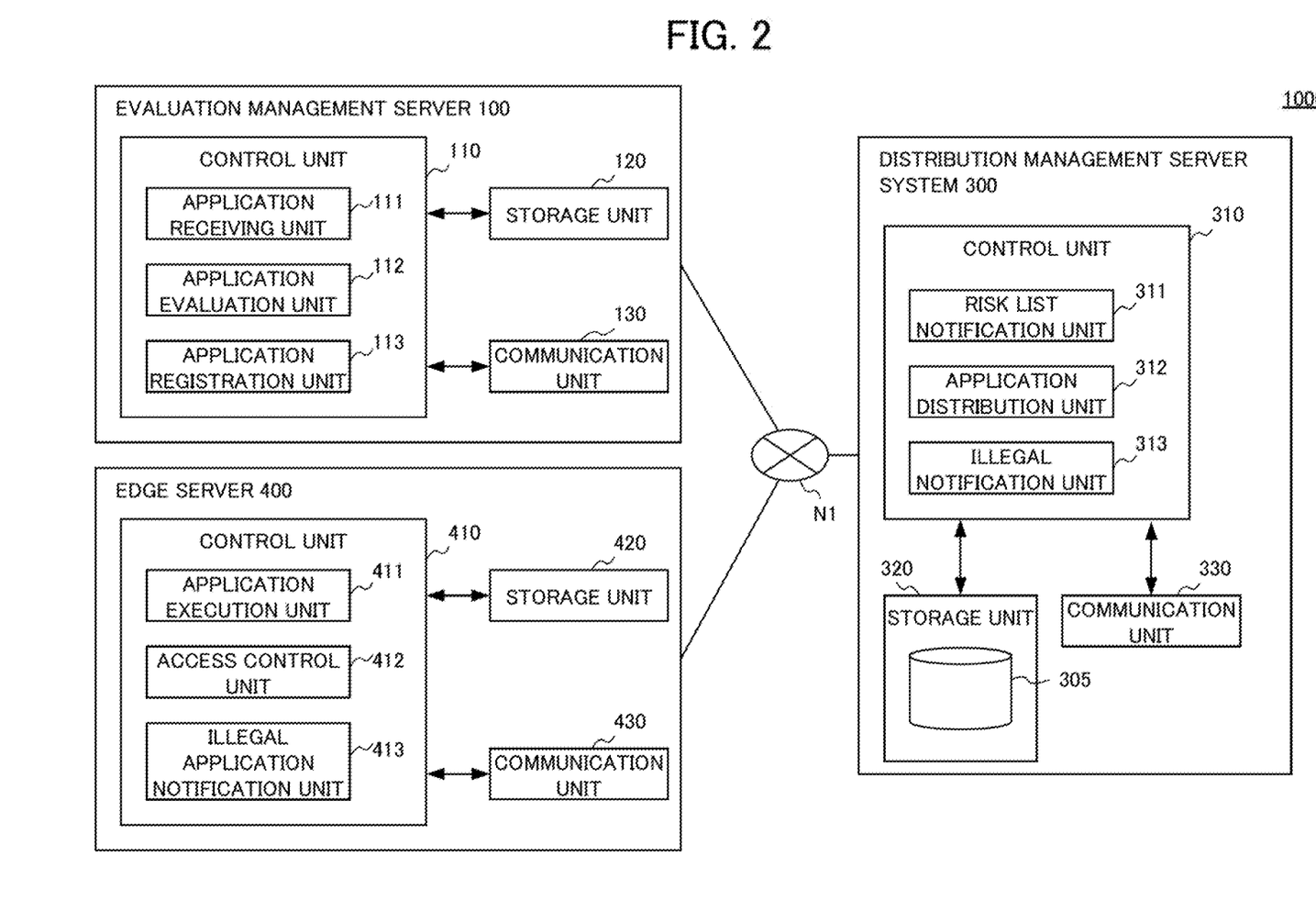
FIG. 2 is a functional block diagram of the application security management system according to the present embodiment.

Next, the functions of respective devices of the application security management system 1000 will be described. FIG. 2 is a functional block diagram of the application security management system 1000 according to the present embodiment.

<Evaluation Management Server 100>

The evaluation management server 100 includes a control unit 110, a storage unit 120, and a communication unit 130. The control unit 110 is a CPU, for example, and controls the evaluation management server 100 in an integrated manner by executing various programs stored in the storage unit 120. For example, the CPU executes a program for a process (hereinafter referred to as an "application receiving process") of receiving an application and an access report list. Moreover, the CPU executes a program for a process (hereinafter referred to as an "application evaluation process") of evaluating the received application and the access report list. Furthermore, the CPU executes a program for a process (hereinafter referred to as an "application registration process") of registering the application in the application DB 305 on the basis of the application evaluation result. In this manner, by executing the programs for the application receiving process, the application evaluation process, and the application registration process, an application receiving unit 111, an application evaluation unit 112, and an application registration unit 113 are formed in the CPU as a functional configuration.

Figure 3:
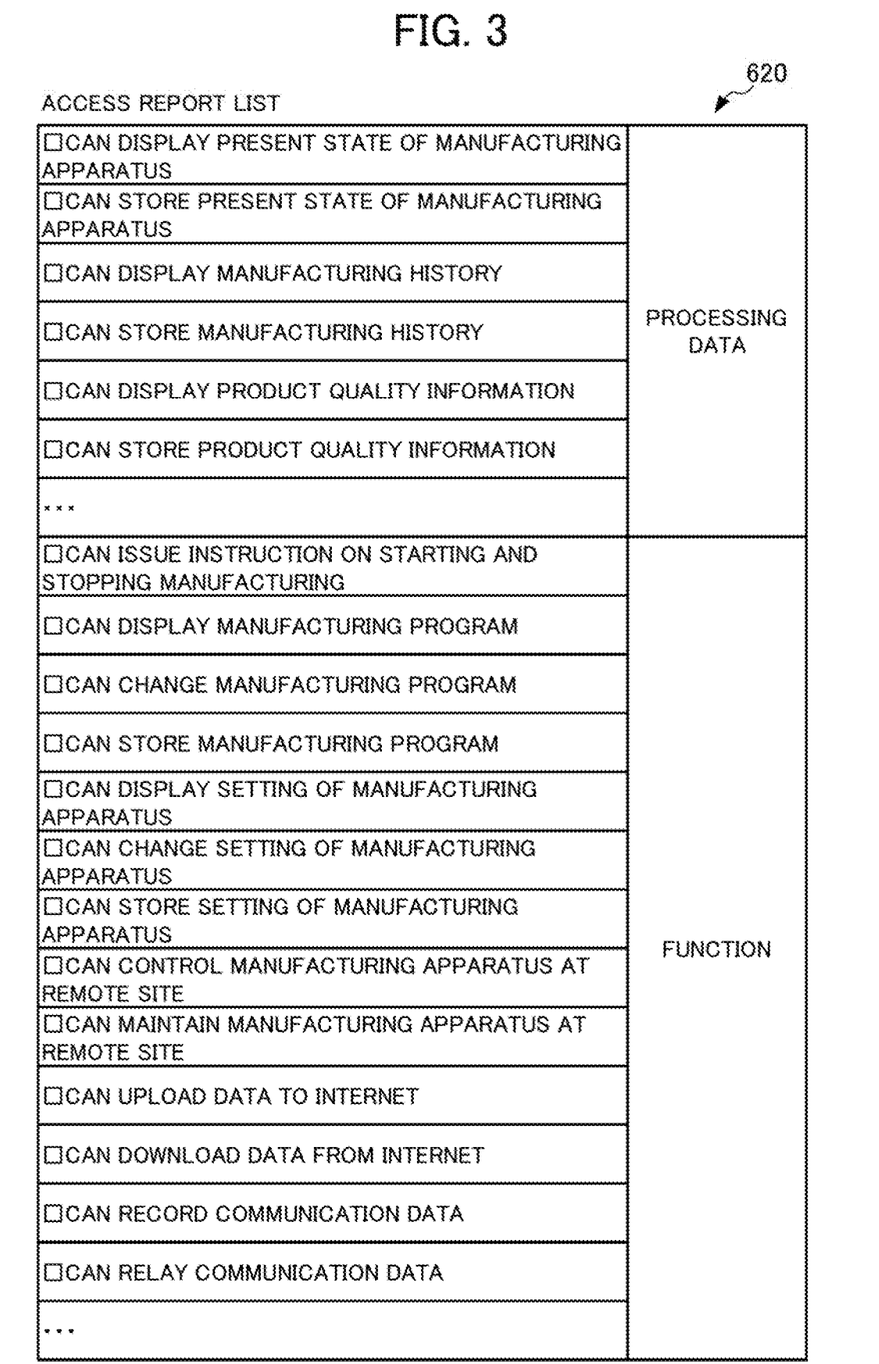
FIG. 3 is a diagram illustrating an example of an access report list of the present embodiment.

The application receiving unit 111 receives an application developed by an application developer and an access report list related to the application. Here, the application receiving unit 111 may receive the application and the access report list from a terminal (for example, a terminal provided to the application developer or a management terminal communicably connected to the evaluation management server 100) communicably connected to the evaluation management server 100 via a network. The application receiving unit 111 may input a computer-readable recording medium having the application and the access report list stored therein via a predetermined input interface and receive the application and the access report list. Here, examples of the computer-readable recording medium include a medium well-known to those skilled in the art such as a magnetic recording medium (for example, a flexible disk, a magnetic tape, or a hard disk drive), an opto-magnetic recording medium (for example, an opto-magnetic disc), an optical disc (for example, CD-ROM, DVD, or Blu-Ray Disc (registered trademark)). FIG. 3 is a diagram illustrating an example of an access report list. For example, the access report list 620 is codes with which a computer can analyze the contents illustrated in FIG. 3. The access report list 620 illustrates the usability of the function related to the edge device 500 and/or the accessibility to the processing data of the edge device 500. A "manufacturing apparatus" corresponds to the edge device 500, and a CNC machine tool, an industrial apparatus, an industrial robot, and the like are designated by an application developer. The access report list 620 is a predetermined form and the application developer sets the accessibility according to the form by filling a check mark in a checkbox, for example.

More specifically, examples of the processing data of the edge device 500 include data indicating the operating state related to the edge device 500, data indicating a production state, data indicating the quality state of a product, and data indicating an event (history) of an operating state or the like. These pieces of processing data are data-modeled (that is, standardized) in advance, and accessibility can be set on the basis of a data model standardized in this manner. By doing so, the application developer can report the accessibility accurately on the basis of a standardized model, and an application evaluator can standardize an evaluation process by eliminating an arbitrary expression of the application developer. Moreover, it is possible to provide a standardized interface for accessing the processing data related to the edge device 500.

Figure 4:
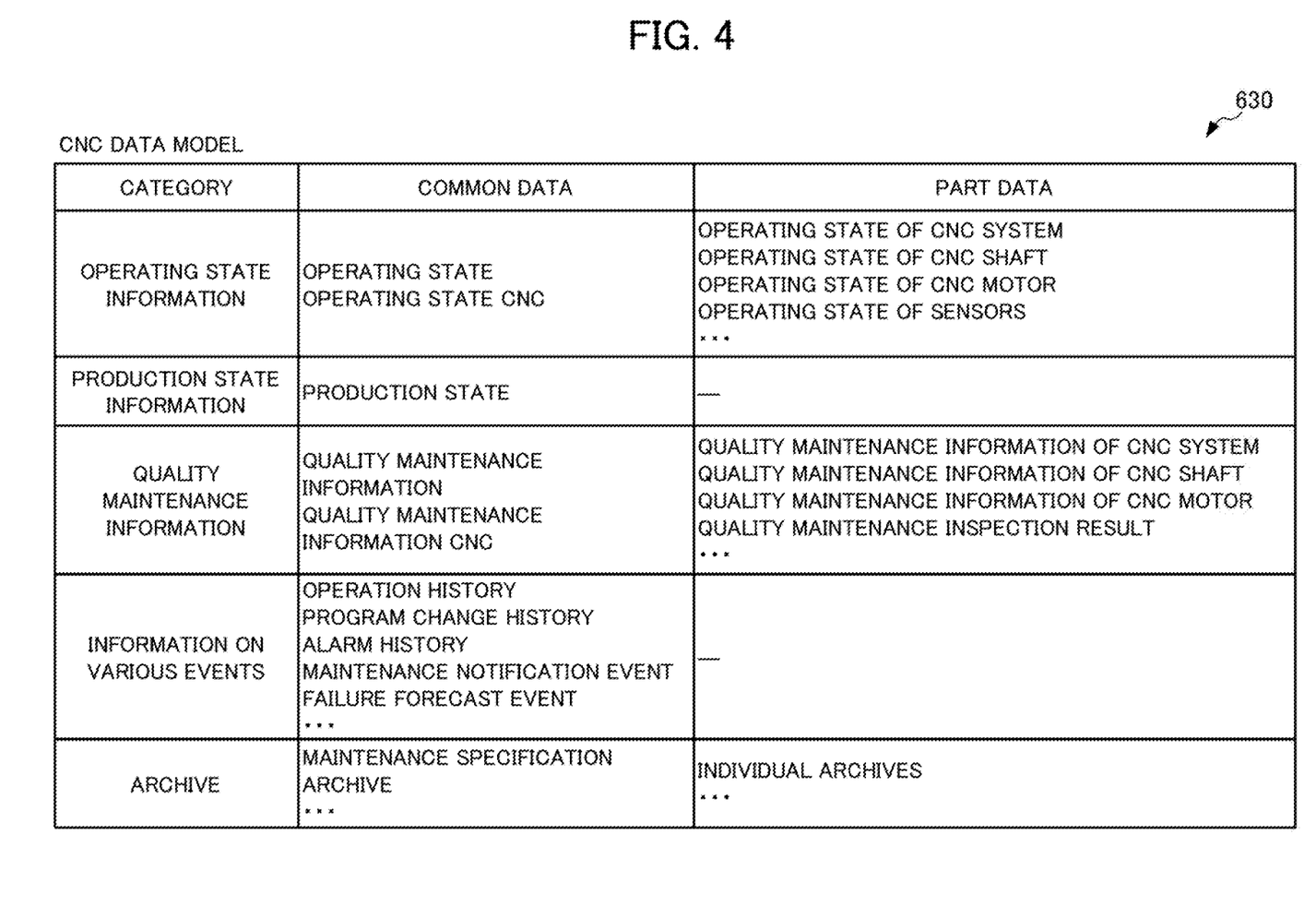
FIG. 4 is a diagram illustrating an example of a data model of processing data of the present embodiment.

FIG. 4 illustrates an example of a data model 630 of the processing data of a CNC machine tool. As illustrated in the data model 630, the processing data can be classified into respective categories of operating state information, production state information, quality maintenance information, various pieces of event (history) information, and archives. Each category includes common data and part data. The common data is data common to a CNC machine tool and the part data is data related to respective parts that form a CNC machine tool such as a shaft and a motor of the CNC machine tool. The application developer designates data to be used according to the data model 630 when creating the access report list 620. Although not illustrated in the drawings, similarly to the processing data, the function of the edge device 500 includes a function related to the operating state, a function related to the production state, a function related to the quality maintenance, a function related to various events (history), and a function related to archives. Similarly to the data model, the function provided by the edge device 500 may be modeled. Thus, it is possible to provide a standardized interface for using the function provided by the edge device 500.

The application evaluation unit 112 illustrated in FIG. 2 evaluates the application and the access report list received by the application receiving unit 111. More specifically, the application evaluation unit 112 evaluates whether the content of the application's usability of the function of the edge device 500 and/or the accessibility to the processing data of the edge device 500 matches the accessibility illustrated in the access report list on the basis of analysis of the source code of the application. Moreover, the application evaluation unit 112 evaluates whether the content of the application's usability of the function of the edge device 500 and/or the accessibility to the processing data of the edge device 500 matches the accessibility illustrated in the access report list on the basis of operation analysis obtained by the edge server 400 executing the application. As described above, such evaluation can be performed automatically since the application uses a standardized interface for using the function provided by the edge device 500 and a standardized interface for accessing the processing data related to the edge device 500.

The application registration unit 113 authorizes that the application is to be distributed and managed by the distribution management server system 300 when the result of the evaluation by the application evaluation unit 112 indicates that the content of the application's usability of the function of the edge device 500 and/or the accessibility to the processing data of the edge device 500 matches the accessibility illustrated in the access report list. The application registration unit 113 registers the authorized application in the application DB 305 in correlation with the access report list.

The storage unit 120 is a storage area that stores programs and the like executed by the control unit 110 and temporarily stores applications and the like received by the application receiving unit 111. The communication unit 130 is a communication control device that transmits and receives data to and from an external device (for example, the terminal 200, the distribution management server system 300, and the like) via the network N1.

<Distribution Management Server System 300>

The distribution management server system 300 includes a control unit 310, a storage unit 320, and a communication unit 330 regardless of the system form thereof. The control unit 310 is a CPU, for example, and controls the distribution management server system 300 in an integrated manner by executing various programs stored in the storage unit 320. For example, the CPU executes a program for a process (hereinafter referred to as a "risk list notification process") of notifying the terminal 200 of an end user of the access report list. Moreover, the CPU executes a program for a process (hereinafter referred to as an "application distribution process") of distributing the application and the access report list to the edge server 400 when authentication data for the access report list is received from the terminal 200 of an end user. Furthermore, the CPU executes a program for a process (hereinafter referred to as an "illegal notification process") of notifying another edge server 400 having distributed the application of the fact that an illegal access has been detected when a notification of detection of an illegal access is received from the edge server 400. In this manner, by executing the programs for the risk list notification process, the application distribution process, and the illegal notification process, a risk list notification unit 311, an application distribution unit 312, and an illegal notification unit 313 are formed in the CPU as a functional configuration.

The risk list notification unit 311 notifies the terminal 200 that has issued an application purchase request or an application distribution request of the access report list corresponding to the application. The application distribution unit 312 distributes the corresponding application and the corresponding access report list to the edge server 400 upon receiving authentication data for the access report list notified by the risk list notification unit 311. Here, the application purchase request or the application distribution request may have an edge server ID which is identification information for identifying the edge server 400 so that the application distribution unit 312 can recognize the designated edge server 400. Moreover, the application distribution unit 312 may store the correlation between the user ID and the edge server ID in the storage unit 320, and the target edge server 400 may be specified from the received user ID of the terminal 200.

Upon receiving a notification that an illegal access different from that of the access report list is detected in an application from the edge server 400, the illegal notification unit 313 notifies another edge server 400 having distributed the application of the fact that an illegal access different from that of the access report list is detected in the application. As will be described later, upon detecting the use of the function of the edge device 500 and/or the access to the processing data of the edge device 500 which is reported as inaccessible in the access report list during execution of an application, the edge server 400 notifies the distribution management server system 300 of the fact that an illegal access related to the application is detected.

The storage unit 320 is a storage area that stores programs and the like executed by the control unit 310. The storage unit 320 includes the application DB 305. The application DB 305 is a database that stores the application authorized by evaluation and the access report list in correlation. The communication unit 330 is a communication control device that transmits and receives data to and from an external device (for example, the evaluation management server 100, the terminal 200, the edge server 400, and the like) via the network N1.

<Edge Server 400>

The edge server 400 includes a control unit 410, a storage unit 420, and a communication unit 430. The control unit 410 is a CPU, for example, and controls the edge server 400 in an integrated manner by executing various programs stored in the storage unit 420. For example, the CPU executes a program for a process (hereinafter referred to as an "application execution process") of executing applications. Moreover, the CPU executes a program for a process (hereinafter referred to as an "access control process") of controlling an access on the basis of the access report list. Furthermore, the CPU executes a program for a process (hereinafter referred to as an "illegal application notification process") of notifying the distribution management server system 300 of the fact that an illegal access related to an application has been detected when the use of the function of the edge device 500 and/or the access to the processing data of the edge device 500 which is reported as inaccessible in the access report list is detected. In this manner, by executing the application execution process, the access control process, and the illegal application notification process, an application execution unit 411, an access control unit 412, and an illegal application notification unit 413 are formed in the CPU as a functional configuration.

Prior to description of the respective functional units of the control unit 410, the storage unit 420 will be described first. The storage unit 420 stores a program including an application downloaded from the distribution management server system 300, executed by the control unit 410 and an access report list corresponding to the downloaded application. Moreover, the storage unit 420 stores a program (middleware or the like) having the function of a controller that manages execution of an application and manages and monitors the application's use of a function related to the edge device 500 and/or the application's access to the processing data of the edge device 500 according to the access report list corresponding to the application.

Next, the respective functional units of the control unit 410 will be described. The application execution unit 411 executes an application stored in the storage unit 420 on the basis of an application activation request. The access control unit 412 monitors the application's use of the function of the edge device 500 and/or the access to the processing data of the edge device 500 on the basis of the content of the access report list correlated with the application executed by the application execution unit 411. The access control unit 412 allows only the use of the function related to the edge device 500 and/or the access to the processing data of the edge device 500 reported as accessible in the access report list. Upon detecting a use request for the function of the edge device 500 and/or the access request for the processing data of the edge device 500 reported as inaccessible in the access report list, the access control unit 412 preferably displays an error message, an alarm, or the like and forcibly stops the application by determining that an illegal access request has been detected. Furthermore, upon receiving illegal information of the application from the distribution management server system 300, the access control unit 412 forcibly stops the application when the application is being executed. Upon detecting the illegal access request or receiving the illegal information of the application, the access control unit 412 preferably prevent future activation of the application. Upon detecting an application's access request contradictory to the report of the access report list, the illegal application notification unit 413 notifies the distribution management server system 300 of the fact that an illegal access related to the application has been detected.

The communication unit 430 is a communication control device that transmits and receives data to and from an external device (for example, the distribution management server system 300 and the like) via the network N1 and transmits and receives data to and from an external device (the edge device 500) via the network N2.

Hereinabove, the functional blocks included in the evaluation management server 100, the distribution management server system 300, and the edge server 400 have been described. The respective devices included in the application security management system 1000 can be realized by hardware, software, or a combination thereof. Here, a device being realized by software means that a computer reads and executes a program (an application) whereby the device is realized. As a specific example, the evaluation management server 100, the distribution management server system 300, and the edge server 400 can be realized by incorporating a program (an application) for realizing the present embodiment in an ordinary server.

Figure 5:
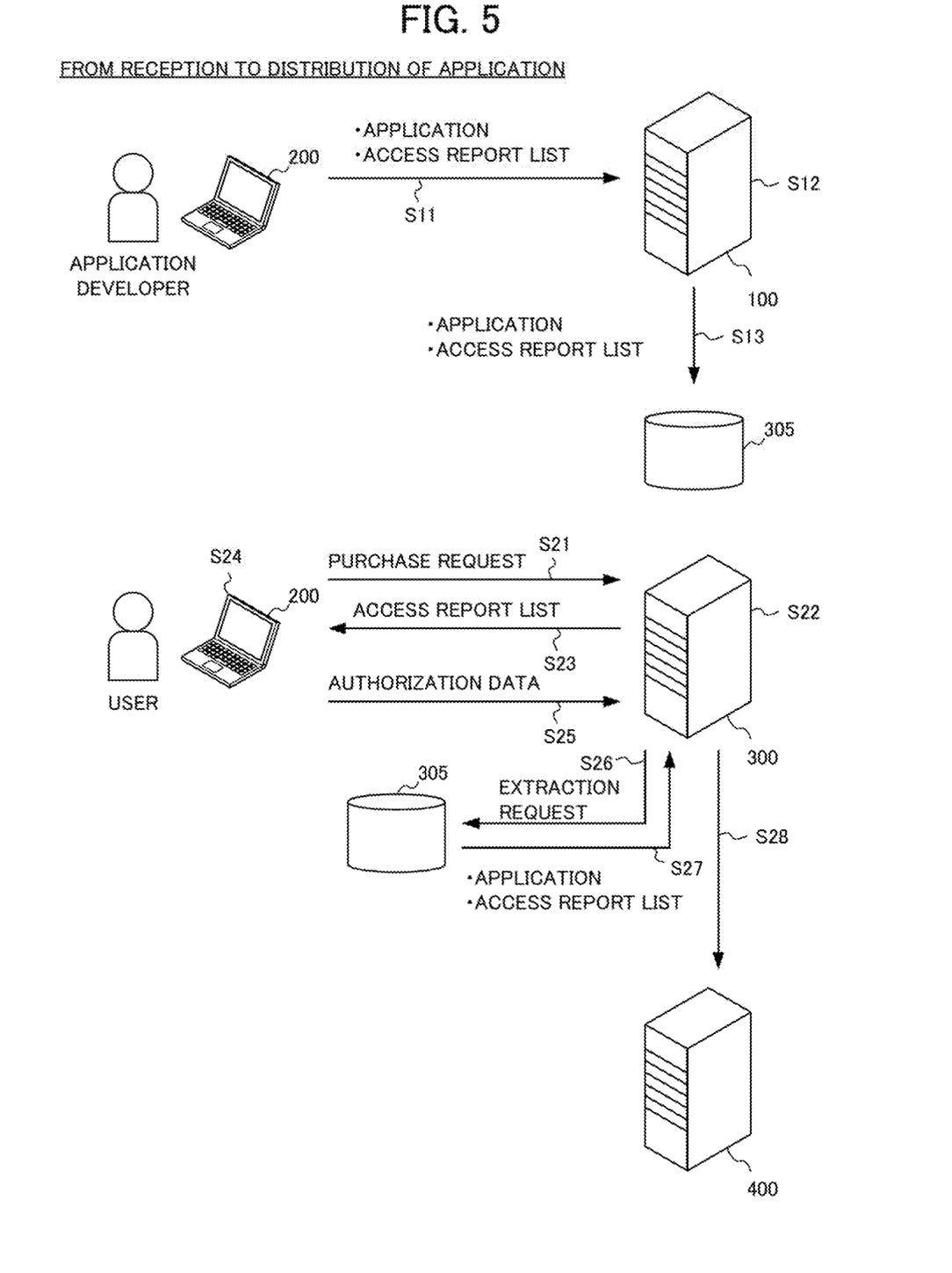
FIG. 5 is a diagram illustrating an outline of the flow from reception to distribution of applications including the process performed by the application security management system of the present embodiment.

Next, the flow of processes in which an application developed by an application developer is received, evaluated, and registered using the application security management system 1000, the registered application is purchased by an end user, and the application is distributed to the edge server 400 will be described with reference to FIG. 5. FIG. 5 is a diagram illustrating an outline of the flow from reception to distribution of applications including the processes of the application security management system 1000 of the present embodiment. In the process flow to be described below, in step S11, the application receiving unit 111 of the evaluation management server 100 receives an application and an access report list from the terminal 200 of the application developer via a network. However, the present invention is not limited thereto. As described above, the application and the access report list may be received (input) via a management terminal or the like communicably connected to the evaluation management server 100, for example. Moreover, the application receiving unit 111 may receive (input) a computer-readable recording medium having the application and the access report list stored therein via a predetermined input interface rather than the network.

[Reception, Evaluation, and Registration of Application]

In step S11 (hereinafter step S will be referred to simply as "S"), an application developer transmits a developed application and an access report list to the evaluation management server 100 using the terminal 200 of the application developer so that the application is evaluated. In S12, the application receiving unit 111 of the evaluation management server 100 receives the application and the access report list. The application evaluation unit 112 evaluates the received application using the received access report list. In S13, when the application and the access report list are authorized by the application evaluation unit 112, the application registration unit 113 registers the application and the access report list in the application DB 305 in correlation.

[Distribution of Application]

An end user refers to the function and the like of an application with the aid of an application browsing screen or the like (not illustrated). When an end user found an application that the user wants to distribute to the edge server 400 thereof, the end user transmits an application purchase request to the distribution management server system 300 using the terminal 200 of the end user in S21. In S22, in response to the application purchase request, the application distribution unit 312 of the distribution management server system 300 extracts an access report list corresponding to the application included in the purchase request from the application DB 305. In S23, the application distribution unit 312 transmits the extracted access report list to the terminal 200 of the end user. In this way, the access report list is displayed on the terminal 200 (S24). Therefore, the end user can ascertain the risk of using the application by viewing the access report list.

After ascertaining the access report list, the end user presses an OK button indicating the intension to admit the risk described in the access report list displayed on the terminal 200, for example. In S25, the terminal 200 transmits the authorization data indicating that the end user has ascertained the risk related to the security, for example, to the distribution management server system 300. Upon receiving the authorization data, in S26, the application distribution unit 312 of the distribution management server system 300 extracts an application and an access report list from the application DB 305. In S27, the application distribution unit 312 acquires the application and the access report list extracted from the application DB 305. In S28, the application distribution unit 312 transmits the acquired application and access report list to the edge server 400 of the end user.

Figure 6:
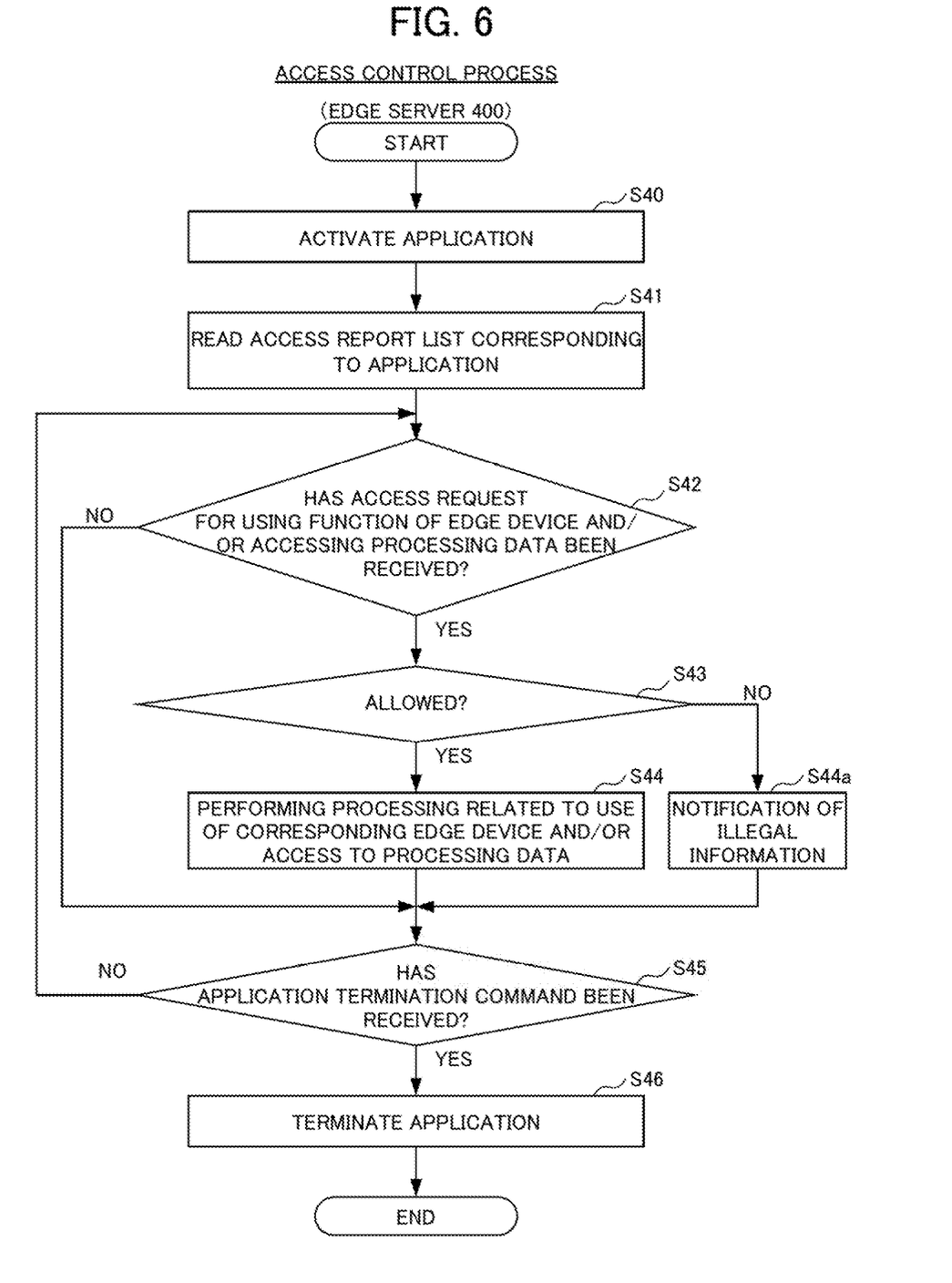
FIG. 6 is a flowchart illustrating an access control process in an edge server according to the present embodiment.
Figure 7:
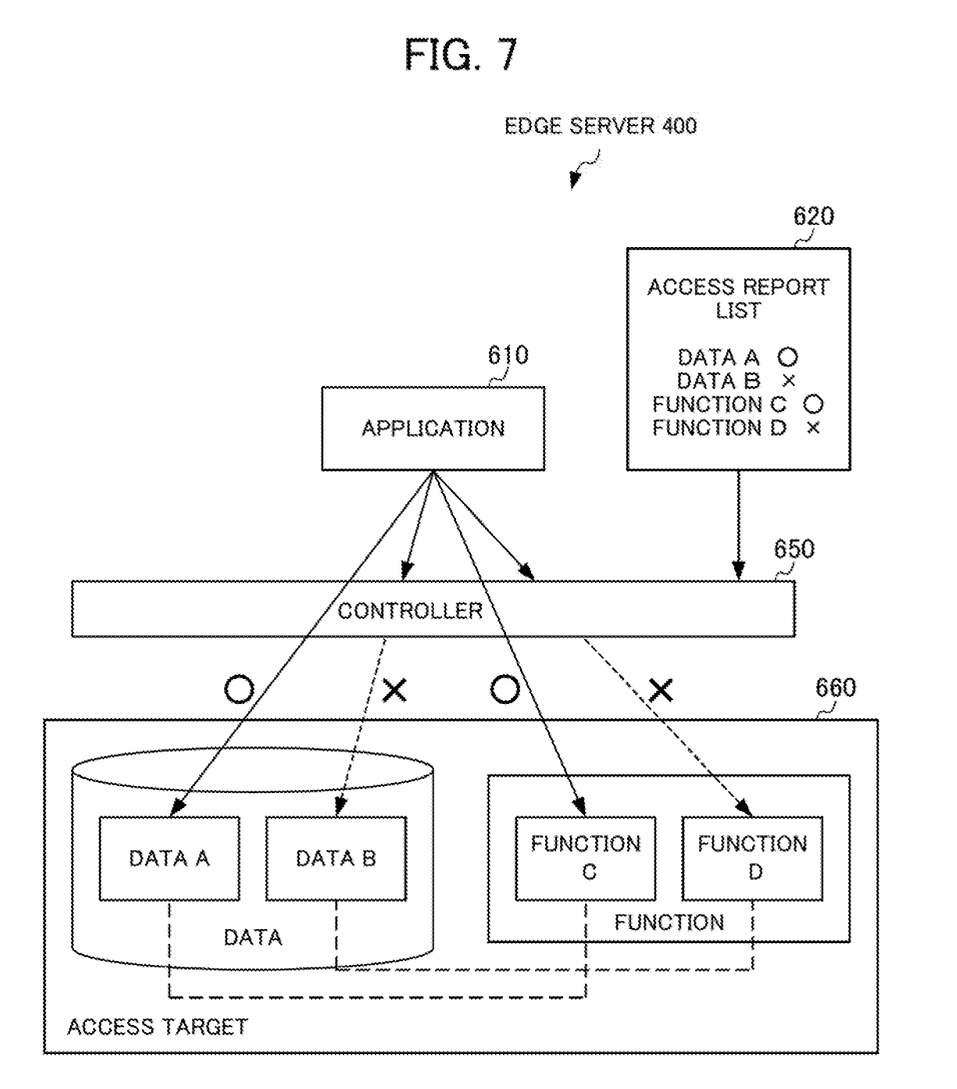
FIG. 7 is a diagram illustrating an example of an access control process in the edge server according to the present embodiment.

Next, control of applications using the access report list performed by the edge server 400 will be described. FIG. 6 is a flowchart illustrating an access control process performed by the edge server 400 of the present embodiment. FIG. 7 is a diagram for describing an access control process performed by the edge server 400 of the present embodiment.

In S40 of FIG. 6, the application execution unit 411 of the edge server 400 activates an application stored in the storage unit 420. Activation of the application is performed at the start-up of a server when the edge server 400 is turned on, for example. In S41, the access control unit 412 reads the access report list corresponding to the application. In the example illustrated in FIG. 7, an access report list 620 corresponding to an application 610 is read by a controller 650 that controls the application 610.

In S42, the access control unit 412 determines whether a use request for the function of the edge device 500 and/or an access request for the processing data of the edge device 500 has been received from the application. When the request is received (S42: YES), the access control unit 412 proceeds to S43. When the request is not received (S42: NO), the access control unit 412 proceeds to S45.

In S43, the access control unit 412 determines whether the use of the function of the edge device 500 and/or the access to the processing data of the edge device 500 corresponding to the request is allowed on the basis of the access report list. When the access is allowed (S43: YES), the access control unit 412 proceeds to S44. On the other hand, when the access is not allowed (S43: NO), the access control unit 412 proceeds to S44a. In S44, the access control unit 412 performs a process of using the function of the edge device 500 and/or accessing the processing data of the edge device 500. After that, the control unit 410 proceeds to S45. On the other hand, in S44a, the illegal application notification unit 413 notifies the distribution management server system 300 of the fact that an illegal access related to the application has been detected by determining that an application's access request contradictory to the report of the access report list has been detected.

In the example illustrated in FIG. 7, the edge server 400 has data A and B and functions C and D as an access target 660. Although the data A is correlated with the function C and the data B is correlated with the function D, the data A is not correlated with the function D, for example. Therefore, in the access report list 620, the data and function having correlation have uniformity in the way the access thereto is allowed or rejected. For example, when a request received from an application is an access request for the data A, since the access is allowed (S43 in FIG. 6: YES), the access control unit 412 performs a process of allowing the application 610 to access the data A by referring to the access report list 620 (S44 in FIG. 6). Moreover, for example, when the request received from the application is a use request for the function D, since the access is not allowed (S43 in FIG. 6: NO), the access control unit 412 does not allow the application 610 to use the function D but notifies the distribution management server system 300 of the fact that an illegal access related to the application has been detected by referring to the access report list 620 (S44a in FIG. 6).

In S45 of FIG. 6, the control unit 410 determines whether an application termination command is received. The control unit 410 determines that an application termination command is received when a notification of the detection of an illegal access related to the application is received or an operation of forcibly terminating the application is received, for example, in addition to when an operation of turning off the edge server 400 is received. On the other hand, when the application termination command is received (S45: YES), the control unit 410 proceeds to S46 and terminates the application. On the other hand, when the application termination command is not received (S45: NO), the access control unit 412 proceeds to S42. In the example illustrated in FIG. 7, when the request received from the application is a use request for the function D, as described above, the access control unit 412 does not allow the application 610 to use the function D but notifies the distribution management server system 300 of the fact that an illegal access related to the application has been received (S44a in FIG. 6). Therefore, the control unit 410 terminates the application by determining that an application termination command is received (S45 in FIG. 6: YES).

When a notification of the detection of an illegal access related to an application is transmitted or a notification of the detection of an illegal access related to an application is received from the distribution management server system 300, the edge server 400 may store the illegal information in the storage unit 420 and may not activate the application. The edge server 400 may activate an application (S40 in FIG. 6) and may immediately terminate the application on the basis of the illegal information.

In this way, the application security management system 1000 evaluates an application developed by an application developer on the basis of an access report list reported by the application developer. The application security management system 1000 registers an application for which the result of the evaluation indicates that the content of the application's usability of the function of the edge device 500 and/or the accessibility to the processing data of the edge device 500 matches the accessibility illustrated in the access report list in the application DB 305 in correlation with the access report list as an authorized application. Therefore, the application is registered in the distribution management server system 300 from which users can purchase the application when the state of the application's use of the function of the edge device 500 and/or the access to the processing data of the edge device 500, the application being developed by the application developer matches the access report list reported by the application developer. In this manner, the application registered in the distribution management server system 300 is authorized by evaluation and has high reliability.

When an end user tries to purchase or download an application, since the application security management system 1000 disables the end user to purchase or distribute the application if the end user does not ascertain the access report list, it is possible to forcibly construct an environment in which the end user ascertains the risk related to the application. Moreover, an end user can download an application to the edge server 400 after admitting the risk of the application. Furthermore, since the application security management system 1000 monitors the accesses of an executed application to the function of the edge device 500 and/or the processing data of the edge device 500 on the basis of the access report list, it is possible to obtain a structure that prevents an illegal access and to further improve the security.

The programs as well as the applications used in the present invention may be stored using various types of non-transitory computer readable media and be supplied to a computer. The non-transitory computer readable media include various types of tangible storage media. Examples of the non-transitory computer readable media include a magnetic recording medium (for example, a flexible disk, magnetic tape, or a hard disk drive), a magneto-optical recording medium (for example, a magneto-optical disk), a CD read only memory (CD-ROM), a CD-R, a CD-R/W, and a semiconductor memory (for example, a mask ROM, a programmable ROM (PROM), an erasable PROM (EPROM), a flash ROM, or a random access memory (RAM)). Moreover, the programs may be supplied to a computer in a form of various types of transitory computer readable media. Examples of transitory computer readable media include electrical signals, optical signals, and electromagnetic waves. The transitory computer readable media can supply programs to a computer via a wired communication path such as an electric wire and an optical fiber or a wireless communication path.

The above-described embodiment is a preferred embodiment of the present invention. However, the scope of the present invention is not limited to the embodiment only but the present invention can be embodied in various modifications without departing from the spirit of the present invention.

(Modification 1)

In the above-described embodiment, the example of the access report list is illustrated in FIG. 3. However, the access report list is not limited thereto. Although examples of the data model are illustrated in FIG. 4, the data model is not limited thereto. A data model similar to that of FIG. 4 may be applied to various manufacturing apparatuses excluding the CNC machine tool.

(Modification 2)

The access report list of the embodiment which an end user ascertains before purchasing or downloading an application is preferably described in words easily understood by an end user, for example, so that the end user can understand functions and/or processing data that are allowed. Moreover, the access report list created by the application developer is preferably easily input by the application developer such that the application developer has to fill a check mark at a corresponding position in a template prepared in advance. The access report list used during execution in the evaluation management server 100 and the edge server 400 may be coded so that the access report list can be processed by a computer.

(Modification 3)

In the above-described embodiment, an example in which the controller 650 performs access control in the edge server 400 has been described. However, the subject of the access control is not limited thereto. The access report list may be configured as a program element of an application so that the request for the use of the function of the edge device 500 and/or the access to the processing data of the edge device 500 is processed on the basis of the access report list in a programmed manner. However, in this case, processing of the request may preferably be confirmed by the access control unit 412.

EXPLANATION OF REFERENCE NUMERALS

100: Evaluation management server
110, 310, 410: Control unit
111: Application receiving unit
112: Application evaluation unit
113: Application registration unit
120, 320, 420: Storage unit
200: Terminal
300: Distribution management server system
305: Application DB
311: Risk list notification unit
312: Application distribution unit
313: Illegal notification unit
400: Edge server
411: Application execution unit
412: Access control unit
413: Illegal application notification unit
500: Edge device
610: Application
620: Access report list
1000: Application security management system

What is claimed is:

1. An application security management system comprising:

an application distribution management server system that manages distribution of an application;

an application evaluation management server that manages evaluation of the application developed by an application developer and distributed by the application distribution management server system;

an application storage unit that stores the application of which the distribution is managed by the application distribution management server system; and an edge server communicably connected to one or more edge devices that executes the application, wherein the application evaluation management server is configured to:

receive the application and a security risk list from the application developer, by providing the application developer with the security risk list, wherein the application developer specifies availability of functionality of an edge device of the one or more edge devices and permissions to process data by the edge device by selecting one or more of a plurality of options within the security risk list which are based on a standardized data model at design time, wherein the specified security risk list is processed by the edge server at runtime to determine the operation or the edge device relating to the functionality and the permissions of the data processing;

evaluate each element of the specified security risk list to determine matches between the specified functionality and permissions and an analysis of a source code of the application and operation analysis obtained by the edge server during execution the application;

authorize that the application be distributed and managed by the application distribution management server system when the result of the evaluation indicates that each evaluated element matches the analysis of the source code and the analysis of the operation; and register the authorized application and the specified security risk list in the application storage unit in correlation, the application distribution management server system is configured to include:

notify a user terminal that issued a purchase request or a distribution request of the specified security risk list corresponding to the registered application upon receiving a purchase request or a distribution request received from the user terminal for the registered application stored in the application storage unit;

receive authorization data from the user terminal in response to the notification; and distribute the application to the edge server in response to the purchase request or the distribution request, in correlation with the specified security risk list, only when the authorization data is received, the edge server is configured to:

store the distributed application and the distributed security risk list;

execute the application on the basis of an activation request for the application; and monitor operation of the executing application to determine compliance between the operation and each element of the distributed security risk list to allow use of the functionality during the processing of the data when the operation is in compliance and to terminate execution of the application when the operation is not in compliance.

2. The application security management system according to claim 1, wherein the security risk list indicates the right to use the functionality of the edge device and execute the processing of the data of the edge device, and the notification is related to the right to use the functionality of the edge device and the execution of the processing of the data of the edge device allowed for the application.

3. The application security management system according to claim 1, wherein the availability of functionality specified in the security risk list includes functionality related to:
    an operating state of the edge device;
    a production state of the edge device;
    quality maintenance of the edge device;
    an event (history) of the edge device; and
    an archive of the edge device.

4. The application security management system according to claim 1, wherein the edge server is further configured to:
    notify the application distribution management server system of illegal information of the application when an illegal access request is detected, the request being a request for using other functionality related to the edge device or for processing other data of the edge device, which is not specified in the security risk list correlated with the application, and
    terminate the application when the illegal access request is detected.

5. The application security management system according to claim 4, wherein the application distribution management server system is further configured to:
    notify the edge server that distributed the application of illegal information of the application upon receiving the illegal information of the application, and
    wherein the edge server is further configured to terminate the application upon receiving illegal information of the application from the application distribution management server system.

* * * * *